(No Model.)

T. HEPBURN.
Horse-Collars.

No. 228,351. Patented June 1, 1880.

Attest.
Sidney P. Hollingsworth
D. P. Cowl

Inventor.
Thomas Hepburn,
By his Attorneys,
Stansbury & Munn

UNITED STATES PATENT OFFICE.

THOMAS HEPBURN, OF HOPKINS, MISSOURI.

HORSE-COLLAR.

SPECIFICATION forming part of Letters Patent No. 228,351, dated June 1, 1880.

Application filed April 7, 1880. (No model.)

*To all whom it may concern:*

Be it known that I, THOMAS HEPBURN, of Hopkins, in the county of Nodaway and State of Missouri, have invented certain new and useful Improvements in Horse-Collars; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
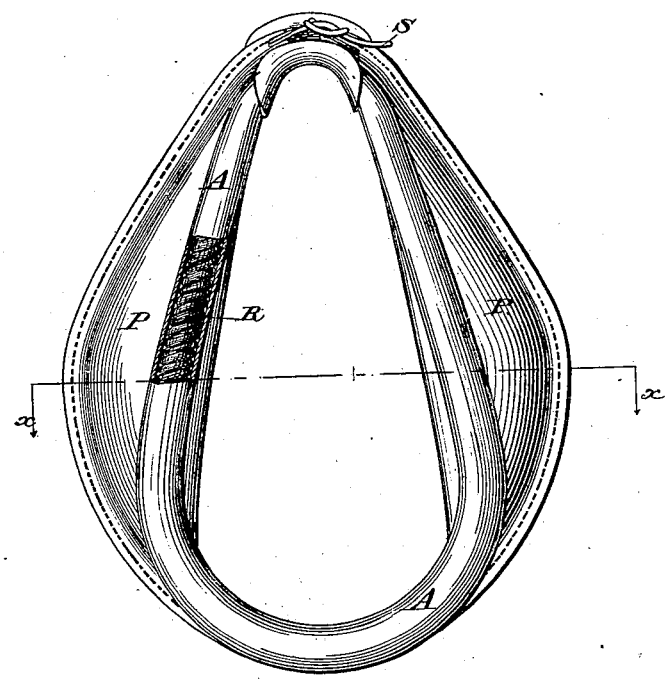
Figure 2:
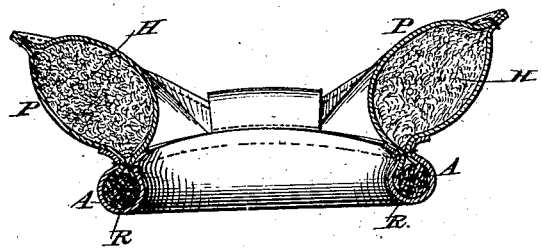

Figure 1 is a front view of the collar, part of the fore wale being cut away to show the rope lining. Fig. 2 is a horizontal section on line $x\ x$ of Fig. 1.

The same letter indicates the same part in both the figures of the drawings.

The nature of my invention consists in the use, as a packing for the pad of a horse-collar, of the dry hulls of small grain, such as oats, rice, or barley, the fore wale being filled with rope or equivalent packing.

I have discovered by practical experiment that grain-hulls are superior to any other material which I have tried, or which I have ever known to be used, as a packing for the pads of horse-collars. They combine lightness, coolness, elasticity, and mobility with the requisite firmness and uniformity of texture. They do not pack in bunches or knots, as most other fillings do. They readily adapt themselves to the peculiarities of the configuration of the neck and shoulders of the animal, and can easily be molded to relieve pressure on a sore or tender spot, or callosity on the horse's shoulders; and, finally, they impart a softness and pliability to the pad which it never loses by use.

The collar is made in the usual way, the rim or fore wale being stuffed preferably with rope or long straw. The hulls for the padding are introduced through a funnel into the top of the collar, and are pressed into position by means of wooden or iron rods until both sides of the pad are uniformly filled and have attained the requisite firmness. After wetting and blocking in the usual manner, the pad is whipped until the filling is evenly distributed throughout and the surface of the pad rendered smooth.

When the pad is to be adapted to a sore or gall the spot to be depressed is beaten with a suitable tool until a sufficient indentation is made to relieve the sore from pressure. When this depression is no longer required the original evenness of surface can readily be restored by pressure with the thumbs on each side of the indentation.

The collar when in use will soon adapt itself without any manipulation to the peculiarities in the shape of the horse's neck or shoulder, and thus afford great ease to the animal in working.

In the drawings, A marks the fore wale or rim of the collar; R, its rope lining; P, the pad; H, the filling of grain-hulls; S, the collar-strap.

I am aware that fine straw has been used for stuffing horse-collars, and that bran has been used for the same or analogous purposes. These articles I distinctly disclaim, and believe them to be greatly inferior to the material I employ. Bran, when damp, cakes into knots and lumps, and cut straw has to be specially prepared for use, and is inferior in lightness, mobility, and elasticity to grain-hulls.

By the use of the hulls I produce a superior article by utilizing a waste material never before employed for this purpose.

What I claim, and desire to secure by Letters Patent, is—

A horse-collar having its pad lined with dry hulls of grain, in the manner and for the purposes specified.

In testimony that I claim the foregoing as my own invention I affix my signature in presence of two witnesses.

THOMAS HEPBURN.

Witnesses:
M. V. DAVIDSON,
D. D. McCOSHEN.